United States Patent
Cheng

(10) Patent No.: US 11,284,029 B2
(45) Date of Patent: Mar. 22, 2022

(54) ACTIVE PIXEL SENSOR ARRAY, DISPLAY PANEL AND ELECTRONIC DEVICE

(71) Applicant: BEIJING XIAOMI MOBILE SOFTWARE CO., LTD., Beijing (CN)

(72) Inventor: Chih-jen Cheng, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 175 days.

(21) Appl. No.: 16/893,164

(22) Filed: Jun. 4, 2020

(65) Prior Publication Data

US 2021/0176420 A1 Jun. 10, 2021

(30) Foreign Application Priority Data

Dec. 4, 2019 (CN) .......................... 201911229219.8

(51) Int. Cl.
  *H04N 5/3745* (2011.01)
  *G09G 3/36* (2006.01)
  *G06V 40/13* (2022.01)
  *G09G 3/3225* (2016.01)
  *H04N 5/378* (2011.01)

(52) U.S. Cl.
  CPC ......... *H04N 5/37455* (2013.01); *G06V 40/13* (2022.01); *G09G 3/3225* (2013.01); *G09G 3/3648* (2013.01); *H04N 5/378* (2013.01)

(58) Field of Classification Search
  None
  See application file for complete search history.

(56) References Cited

U.S. PATENT DOCUMENTS

2018/0167571 A1 * 6/2018 Mabuchi ................. H03M 1/56

FOREIGN PATENT DOCUMENTS

| EP | 2169948 A2 | 3/2010 |
|----|------------|--------|
| EP | 2169948 A3 | 3/2014 |
| WO | 2008064435 A1 | 6/2008 |

OTHER PUBLICATIONS

Extended European Search Report in Application No. 20180608, dated Sep. 24, 2020.

* cited by examiner

*Primary Examiner* — Mark T Monk
(74) *Attorney, Agent, or Firm* — Syncoda LLC; Feng Ma

(57) ABSTRACT

An active pixel sensor array includes plurality of pixel circuits arranged in multiple rows and one column or multiple rows and multiple columns, each pixel circuit including: photoelectric conversion sub-circuit; resetting sub-circuit for resetting photoelectric conversion sub-circuit based on reset signal; source following sub-circuit connected between resetting sub-circuit and photoelectric conversion sub-circuit; strobing sub-circuit connected to source following sub-circuit and for switching on/off state based on strobe signal; and pre-discharging sub-circuit with one terminal connected between source following sub-circuit and strobing sub-circuit, and for switching on/off state based on received pre-discharge signal; when pixel circuits are arranged in multiple rows and columns, on time and off time of strobing sub-circuit in same row are same, and on time of strobing sub-circuit in each row is same as that of pre-discharging sub-circuit in next row, and off time of strobing sub-circuit is same as that of pre-discharging sub-circuit in next row.

20 Claims, 8 Drawing Sheets

ACTIVE PIXEL SENSOR ARRAY, DISPLAY PANEL AND ELECTRONIC DEVICE

CROSS-REFERENCE TO RELATED APPLICATION

This disclosure claims priority to Chinese Patent Application No. 201911229219.8 filed on Dec. 4, 2019, the disclosure of which is hereby incorporated by reference in its entirety.

BACKGROUND

With the development of electronics technologies, user's requirements for terminal devices, especially for the specifications of display regions and display effects of the terminal devices, are also increasing. To meet the demands of users, major manufacturers have proposed various technical solutions to increase the screen ratio of the terminal devices. For example, in related technologies, a fingerprint detection module can be disposed under the display panel to realize an under-screen fingerprint detection. Specifically, the fingerprint detection module can generally emit light and receive the light reflected by the fingers, and further acquire electronic signals through a photodiode to implement fingerprint detection.

SUMMARY

The present disclosure generally relates to a field of electronic device technologies, and more specifically to an active pixel sensor array, a display panel and an electronic device.

According to a first aspect of embodiments of the present disclosure, there is provided an active pixel sensor array including a plurality of pixel circuits arranged in multiple rows and one column or multiple rows and multiple columns, each of the pixel circuits includes:
  a photoelectric conversion sub-circuit;
  a resetting sub-circuit configured to reset the photoelectric conversion sub-circuit based on a received reset signal;
  a source following sub-circuit connected between the resetting sub-circuit and the photoelectric conversion sub-circuit;
  a strobing sub-circuit connected to the source following sub-circuit and configured to switch an on/off state, based on a received strobe signal, to output, when it is in an on state, a voltage signal of the photoelectric conversion sub-circuit; and
  a pre-discharging sub-circuit with one terminal connected between the source following sub-circuit and the strobing sub-circuit, and configured to switch the on/off state based on a received pre-discharge signal;
  wherein when the plurality of pixel circuits are arranged in the multiple rows with multiple columns, both of on time and off time of the strobing sub-circuit in a same row are the same, and for the each row, the on time for the strobing sub-circuit is as same as the on time of the pre-discharging sub-circuit in the next row, the off time of the strobing sub-circuit is as same as the off time of the pre-discharging sub-circuit in the next row.

In some embodiments, the off time of the strobing sub-circuit in each row is after the on time of the strobing sub-circuit in the next row.

In some embodiments, a terminal for receiving the strobing signal on the strobing sub-circuit in each row and a terminal for receiving the pre-discharge signal on the pre-discharging sub-circuit in the next row are connected to a same control line.

In some embodiments, a terminal for receiving the strobing signal on the strobing sub-circuit in each row and a terminal for receiving the pre-discharge signal on the pre-discharging sub-circuit in the next row are connected to different control lines, and rising edge time and falling edge time of pulse signals output from the different control lines are the same respectively.

In some embodiments, each of the pixel circuits further includes a first voltage terminal, a gate of the resetting sub-circuit is used to receive the resetting signal, a drain thereof is connected to the first voltage terminal and a source thereof is connected to the photoelectric conversion sub-circuit.

In some embodiments, each of the pixel circuits further includes a second voltage terminal, a gate of the source following sub-circuit is connected between the photoelectric conversion sub-circuit and the resetting sub-circuit, a drain thereof is connected to the second voltage terminal and a source thereof is connected to the strobing sub-circuit.

In some embodiments, a gate of the strobing sub-circuit is configured to receive the strobe signal, a drain thereof is connected to the source of the source following sub-circuit, and a source thereof is configured to output the voltage signal of the photoelectric conversion sub-circuit.

In some embodiments, each of the pixel circuits further includes a third voltage terminal, a gate of the pre-discharging sub-circuit is configured to receive the pre-discharge signal, a drain thereof is connected to the third voltage terminal and a source thereof is connected between the source following sub-circuit and the strobing sub-circuit.

According to a second aspect of embodiments of the present disclosure, there is provided a display panel including:
  the active pixel sensor array of any one of embodiments described above, which is configured to form a fingerprint detecting region on a surface of the display panel, and each of the pixel circuits is formed in a pixel; and
  a chip component connected to each of the pixel circuits and configured to output the resetting signal, the strobe signal and the pre-discharge signal.

According to a third aspect of embodiments of the present disclosure, there is provided an electronic device including the any one of the display panels described above.

It is to be understood that both the foregoing general description and the following detailed description are exemplary and explanatory only and are not restrictive of the disclosure.

BRIEF DESCRIPTION OF THE DRAWINGS

The accompanying drawings, which are incorporated in and constitute a part of this description, illustrate embodiments consistent with the disclosure and, together with the description, serve to explain the principles of the disclosure.

DETAILED DESCRIPTION

Description will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the disclosure. Instead, they are merely examples of apparatuses and methods consistent with aspects related to the disclosure as recited in the appended claims.

The terminology used herein is for the purpose of describing particular embodiments only and is not intended to be limiting of the present disclosure. As used in the present disclosure and appended claims, the singular forms "a," "said" and "the" are intended to include the plural forms as well, unless the context clearly indicates otherwise. It will be further understood that, as used herein, the term "and/or" includes any and all combinations of one or more of the associated listed items.

It will be understood that, although the terms first, second, third etc. can be used herein to describe various information, the information should not be limited by these terms. These terms are only used to distinguish one kind of information from another kind of information. Thus, first information could be termed second information without departing from the teachings of the present invention. Similarly, the second information could be also termed as the first information. Depending on context, as used herein, the term "if" could be explained as "when" or "while" or "response to determine."

As aforementioned, in order to meet the requirements of users, major manufacturers have proposed various technical solutions to increase the screen ratio of the terminal devices. For example, in related technologies, a fingerprint detection module can be disposed under the display panel to realize an under-screen fingerprint technology. Specifically, the fingerprint detection module can generally emit light and receive the light reflected by the fingers, and further acquire electronic signals through a photodiode to implement fingerprint detection.

Figure 1:
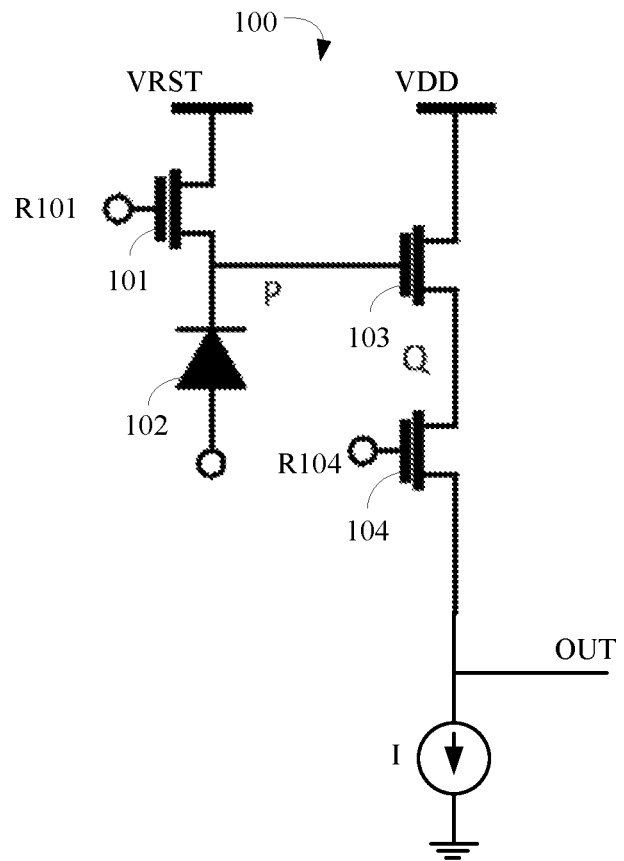
FIG. 1 is a schematic diagram illustrating a circuit of an active pixel sensor in the related technologies.

FIG. 1 is schematic diagram illustrating a circuit of an active pixel sensor 100 in the related technologies. As illustrated in FIG. 1, the active pixel sensor 100 can include a resetting transistor 101, a photodiode 102, a source following transistor 103 and a strobing transistor 104. Herein, when a plurality of active pixel sensors 100 form an array, signal lines for inputting a reset signal R101 to the resetting transistor 101 are connected to a same control line, signal lines for inputting a strobe signal R104 to the strobing transistor 104 are connected to a same control line, input voltage terminals VRST are connected to a same voltage line, and input voltage terminals VDD are connected to a same voltage line. The photodiode 102 can perform a photoelectric conversion based on the detected light, and the active pixel sensor 100 can obtain a voltage signal being photoelectric converted by the photodiode 102 through detecting a voltage at a point P between the resetting transistor 101 and the photodiode 102.

Figure 2:
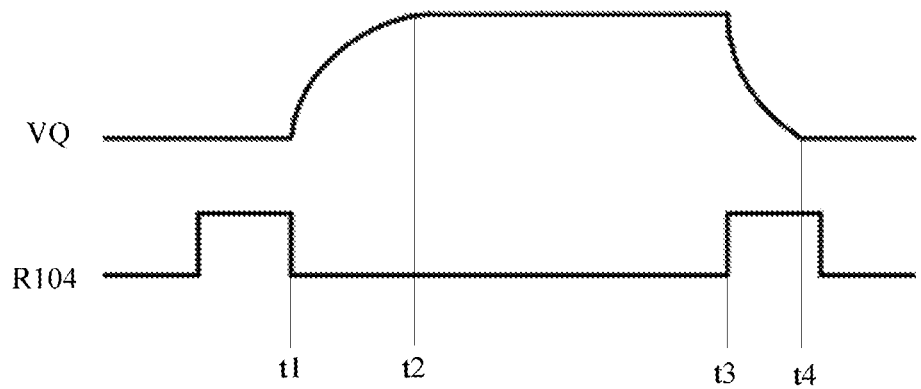
FIG. 2 is a timing diagram illustrating a strobe signal in the related technologies.

Specifically, as illustrated in FIG. 2, the resetting transistor 101 and the strobing transistor 104 can be turned on at the same time, the photodiode 102 can be reset by the resetting transistor 101, and a loop among the photodiode 102, the source following transistor 103 and the strobing transistor 104 is established through a current I. At this time, a voltage at an arbitrate point Q between the source following transistor 103 and the strobing transistor 104 is a voltage at a terminal OUT, and a voltage V1 at the point P can be obtained based on the voltage at the terminal OUT and a predetermined relationship. Afterwards, at a time t1, the resetting transistor 101 and the strobing transistor 104 are switched to an off state, and at this time the photodiode 102 starts to accumulate optical signals and convent the same as voltage signals. At time t3, the strobing transistor 104 is turned on and the loop among the photodiode 102, the source following transistor 103 and the strobing transistor 104 is established again through the current I, and at this time the voltage at the point Q can be obtained again, and a voltage V2 at the point P can be further obtained based on the predetermined relationship. Then, a photoelectric signal can be obtained based on a difference between the voltage V1 and voltage V2.

However, in the related technologies, during the strobing transistor 104 is in the off state, that is, in a period of time from the time t1 to time t3, since the strobing transistor 104 is turned off due to the effect of the voltage VDD, it is caused that the voltage at the point Q increases gradually, and the maximum voltage can be lifted to VH=VDD. When the strobing transistor 104 is turned on at the time t3, the loop is connected, and when the voltage at the point Q falls back to the stable state, the voltage at the point Q obtained at the time t4 is the voltage at the terminal OUT. It could be understood that falling back to the stable state from VH at the point Q has to take a time period of t4-t3, which would defer an acquisition time for the voltage at the point Q and delay the output of the photoelectric signal. Especially when the active pixel sensors 100 are arranged in an array, the acquisition of the voltages on each row of the active sensors 100 must be deferred for the time period of t4-t3, which will inevitably lead to an increase in the reading time period of the entire array signal.

Figure 3:
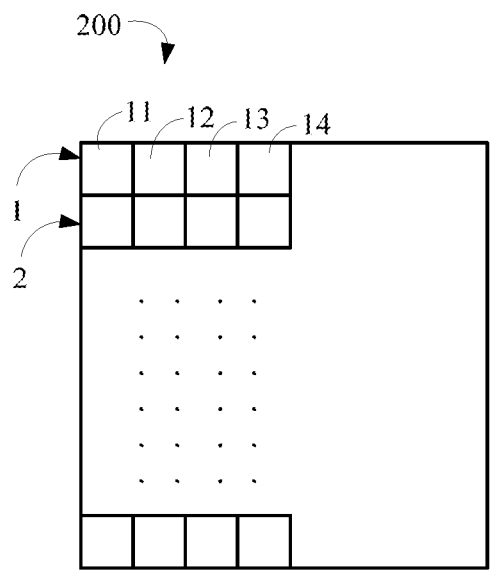
FIG. 3 is a schematic diagram illustrating a structure of an active pixel sensor array according to some embodiments.

In view of this, various embodiments of the present disclosure provide an active pixel sensor array 200 as illustrated in FIG. 3, the active pixel sensor array 200 can include multiple rows of pixel circuits, each row of the pixel circuits include one or more pixel circuits, that is, the active pixel sensor array 200 can include the pixel circuits arranged in multiple rows and one column or the pixel circuits arranged in multiple rows and multiple columns. For example, FIG. 3 illustrates a first row of pixel circuits 1 and a second row of pixel circuits 2. The first row of pixel circuits 1 can include a first pixel circuit 11, a second pixel circuit 12, a second pixel circuit 13 and a fourth pixel circuit 14. Similarly, the second row of pixel circuits 2 can also include a plurality of pixel circuits. Each of the pixel circuits 11 can have a same circuit structure. Therefore, in the present disclosure, the circuit structure is described in details by taking the first pixel circuit 11 as an example.

Figure 4:
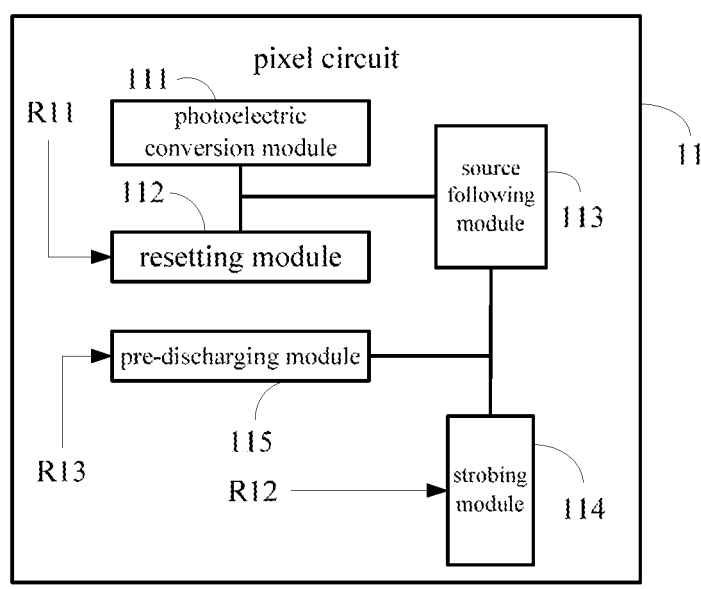
FIG. 4 is a block diagram illustrating a structure of a pixel circuit according to some embodiments.

As illustrated in FIG. 4, the first pixel circuit 11 can include a photoelectric conversion sub-circuit 111, a resetting sub-circuit 112, a source following sub-circuit 113 and a strobing sub-circuit 114. Herein, the resetting sub-circuit 112 is connected to the photoelectric conversion sub-circuit 111 and can reset the photoelectric conversion sub-circuit 111 based on a received reset signal R11. The source following sub-circuit 113 is connected between the resetting sub-circuit 112 and the photoelectric conversion sub-circuit 111 to read an output voltage of the photoelectric conversion sub-circuit 111 through a relationship between a source voltage of the source following sub-circuit 113 and a gate voltage input to the source following sub-circuit 113 by the photoelectric conversion sub-circuit 111. The strobing sub-circuit 114 is connected to the source following sub-circuit 113 and can switch the on/off state based on a received strobe signal R12, to output a voltage signal of the photoelectric conversion sub-circuit 111 when the strobing sub-circuit 114 is in an on state.

The first pixel circuit 11 can further include a pre-discharging sub-circuit 115 with one terminal connected between the source following sub-circuit 113 and the strobing sub-circuit 114, and the pre-discharging sub-circuit 115 can switch the on/off state based on a received pre-discharge signal R13. When the pre-discharging sub-circuit 115 is switched to the on state, a voltage between the source following sub-circuit 113 and the strobing sub-circuit 114 can be pulled down by the pre-discharging sub-circuit 115, because there is a voltage difference between a voltage at the voltage terminal to which the pre-discharging sub-circuit 115 is connected and a voltage between the source following sub-circuit 113 and the strobing sub-circuit 114. Herein, the voltage at the voltage terminal to which the pre-discharging sub-circuit 115 is connected can be greater than or equal to a voltage output from the terminal OUT in the stable state to avoid over-discharging.

In this embodiment, when the pixel circuits are arranged in multiple rows and one column, namely, each row of the pixel circuits includes only one strobing sub-circuit 114, an on time and off time of each row of the pre-discharge sub-circuit 115 can be determined subsequently based on the on time and off time of the one strobing sub-circuit 114; when the pixel circuits are arranged in multiple rows and multiple columns, the on time and off time of the strobing sub-circuits 114 in the same row are the same, and the on time and off time of the pre-discharging sub-circuit 115 in the each row can be determined based on the on time and off time of the plurality of strobing sub-circuits 114 in the same row. The strobing sub-circuits 114 in the plurality of rows can be turned on and off sequentially.

Figure 5:
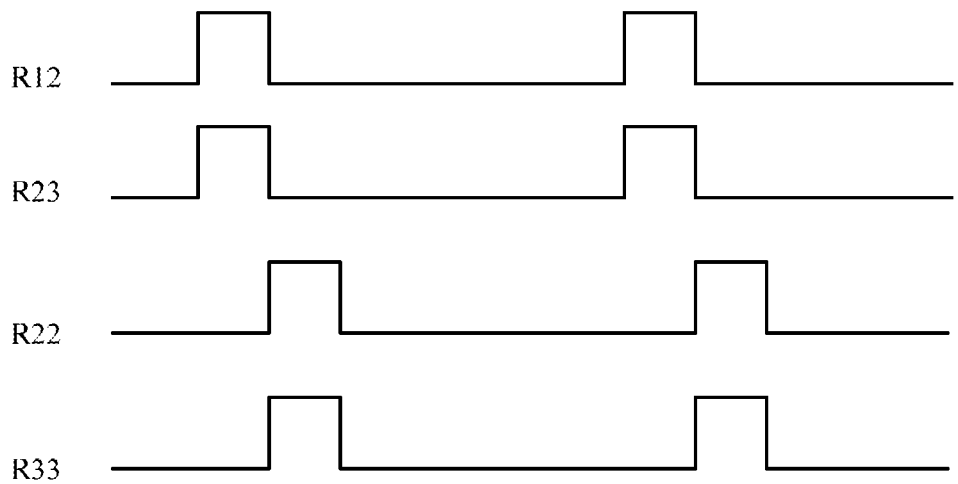
FIG. 5 is a timing diagram illustrating a strobe signal and a pre-discharge signal according to some embodiments.

Taking FIG. 4 as an example, the on time of the strobing sub-circuit 114 in each row is the same as the on time of the pre-discharging sub-circuit 115 in the next row, and the off time of the strobing sub-circuit 114 is the same as the off time of the pre-discharging sub-circuit 115. For example, in FIG. 5, when the strobing sub-circuit(s) 114 of the first row of pixel circuits 1 is turned on, the pre-discharging sub-circuit(s) 115 in the second row of pixel circuits 2 is turned on, so that an arbitrate point between the source following sub-circuit 113 and the strobing sub-circuit 114 in each pixel circuit of the second row of pixel circuits 2 is pre-discharged thereby the voltage between the source following sub-circuit 113 and the strobing sub-circuit 114 drops. When the strobing sub-circuit 114 in the second row of pixel circuit 2 is turned on at the next time, the time period between the source following sub-circuit 113 and the strobing sub-circuit 114 falling from a high voltage state to a stable state can be shortened, because the voltage between the source following sub-circuit 113 and the strobing sub-circuit 114 has dropped in part at the previous time, which is beneficial to enhance a signal readout efficiency of the active pixel sensor array 200. Similarly, when the strobing sub-circuit 114 in the second row of the pixel circuit 2 is turned on, the pre-discharging sub-circuit 115 in the third row of pixel circuit is turned on to pre-discharge, and so on. The signal readout period could be reduced greatly for the whole active pixel sensor array 200. FIG. 5 is described by taking a high-level on and a low-level off as an example, and the present disclosure is not limited thereto.

Figure 6:
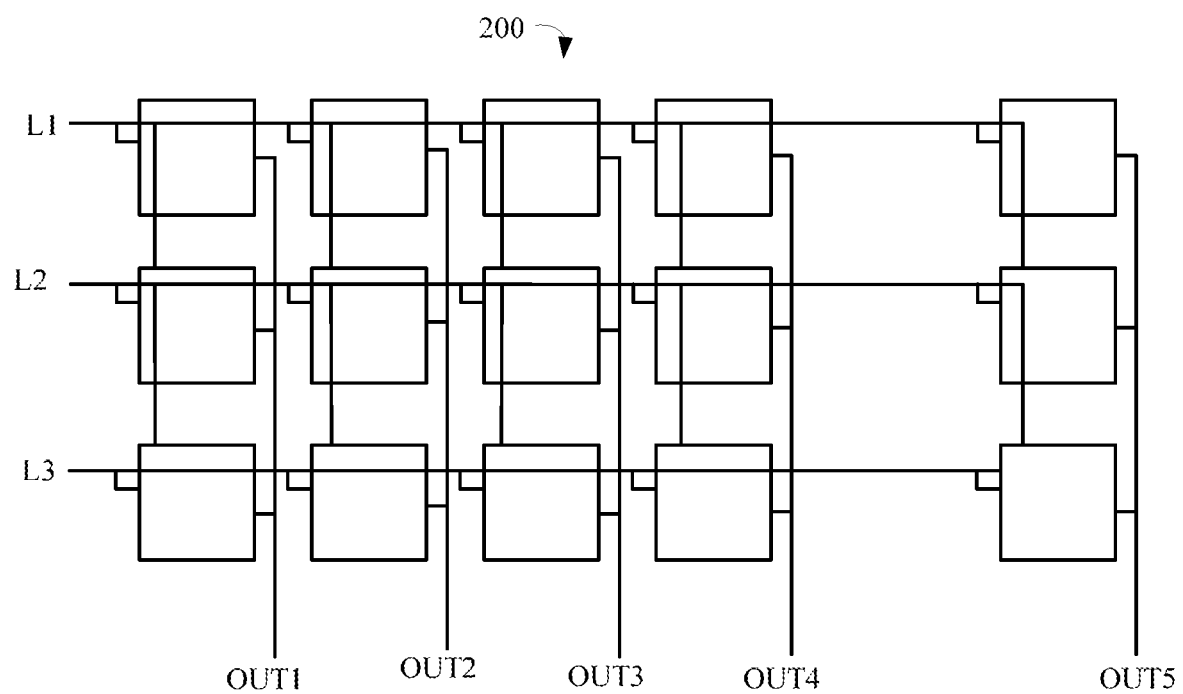
FIG. 6 is a schematic diagram illustrating a structure of another active pixel sensor array according to some embodiments.

In this embodiment, for the control modes of the strobing sub-circuit in each row and the pre-discharging sub-circuit in the next row, the present disclosure further provides an active pixel sensor array 200. In an embodiment, as illustrated in FIG. 6, in the active pixel sensor array 200, a terminal for receiving the strobe signal on the strobing sub-circuit in each row and a terminal for receiving the pre-discharge signal on the pre-discharging sub-circuit in the next row are connected to a common control line. For example, as illustrated in FIG. 6, a control line L1 is configured to input a strobe signal R12 to the each pixel circuit in the first row of pixel circuits, so as to instruct the strobing sub-circuit of the each pixel circuit in the first row of pixel circuits to switch the on/off state. At the same time, the strobe signal R12 input from the control line L2 can also be input to the pre-discharging sub-circuit of the each pixel circuit in the second row of pixel circuits as the pre-discharge signal R23, so that the pre-discharging sub-circuits in the second row of pixel circuits are turned on when the strobing sub-circuits in the first row of pixel circuits are turned on. The strobing sub-circuits and the pre-discharging sub-circuits in adjacent rows share the common control line L1, such that the structure of the active pixel sensor array 200 can be simplified and wirings can be reduced.

Similarly, as illustrated in FIG. 6, a control L2 is configured to input a strobe signal R22 to the each pixel circuit in the second row of pixel circuits, so as to instruct the strobing sub-circuit of the each pixel circuit in the second row of pixel circuits to switch the on/off state. At the same time, the strobe signal R22 input from the control line L2 can also be input to the pre-discharging sub-circuit of the each pixel circuit in the third row of pixel circuits as the pre-discharge signal R33, so that the pre-discharging sub-circuits in the third row of pixel circuits are turned on when the strobing sub-circuits in the second row of pixel circuits are turned on. And so on, a timing control for the pre-discharging sub-circuits in the active pixel sensor array 200 can be realized. In the active pixel sensor array 200, the control lines connected to the strobing sub-circuits can be connected to a same bus, and then connected to a chip in a device provided with the active pixel sensor array 200. In the same way, output terminals OUT1, OUT2, OUT3, OUT4 and OUT5 can also be connected to a same bus and then connected to the chip in the device provided with the active pixel sensor array 200.

Figure 7:
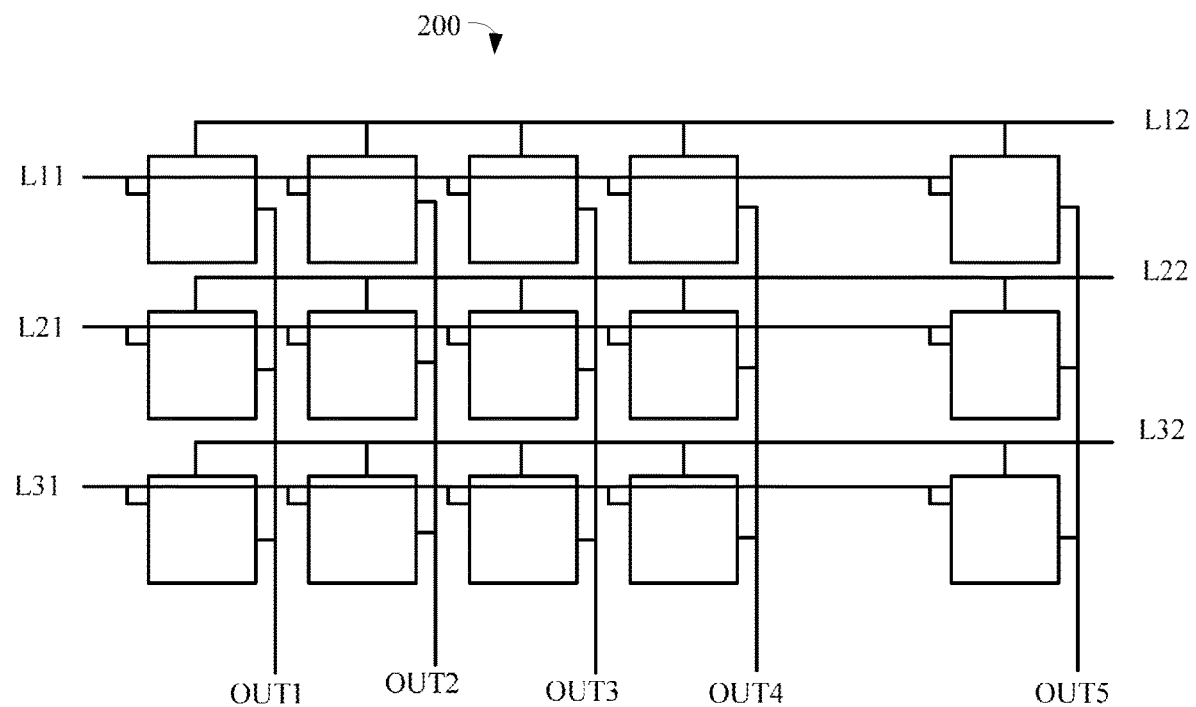
FIG. 7 is a schematic diagram illustrating a structure of another active pixel sensor array according to some embodiments.
Figure 8:
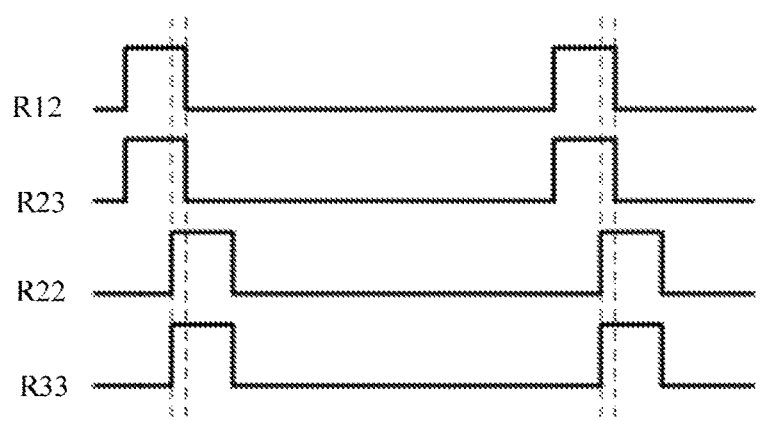
FIG. 8 is a timing diagram illustrating another strobe signal and another pre-discharge signal according to some embodiments.

In another embodiment, as illustrated in FIG. 7, the terminal for receiving the strobe signal on the strobing sub-circuit in each row, and the terminal for receiving the pre-discharge signal on the pre-discharging sub-circuit in the next row are connected to different control lines, and rising edge time and falling edge time of pulse signals output from the different control lines are the same respectively. Therefore, it is beneficial to separately control the strobing sub-circuits and the pre-discharging sub-circuits in the adjacent rows, which can reduce the circuit difficulty. As illustrated in FIG. 7, a control line L11 is configured to input the strobe signal to the strobing sub-circuits in the first row of pixel circuits, a control line L21 is configured to input the strobe signal to the strobing sub-circuits in the second row of pixel circuits, and a control line L31 is configured to input the strobe signal to the strobing sub-circuits in the third row of pixel circuits; a control line L12 is configured to input the pre-discharge signal to the pre-discharging sub-circuits in the first row of pixel circuits, a control line L22 is configured to input the pre-discharge signal to the pre-discharging sub-circuits in the second row of pixel circuits, and a control line L32 is configured to input the pre-discharge signal to the pre-discharging sub-circuits in the third row of pixel circuits. Herein, as illustrated in FIG. 8, the rising edge time of the strobe signal R12 output from the control line L11 is the same as the rising edge time of the pre-discharge signal R23 output from the control L12, and he falling edge time of the strobe signal R12 output from the control line L11 is the same as the falling edge time of the pre-discharge signal R23 output from the control L12; the rising edge time of the strobe signal R22 output from the control line L21 is the same as the rising edge time of the pre-discharge signal R33 output from the control L32, and the falling edge time of the strobe signal R22 output from the control line L21 is the same as the falling edge time of the pre-discharge signal R33 output from the control L32.

In the various embodiments described above, as still illustrated in FIG. 8, the off time of the strobing sub-circuits in each row is after the on time of the strobing sub-circuits in the next row. In other words, the strobing sub-circuits in the next row have been turned on before the strobing sub-circuits in each row are turned off, and represented in the timing, as illustrated in FIG. 8, the falling-edge signal of the strobing sub-circuits in each row is behind the rising-edge signal of the strobing sub-circuits in the next row. Therefore, based on the structure of a circuit illustrated in FIG. 9, since it needs the current I and the strobing sub-circuit 114 to establish the voltage at the point Q, if the falling-edge signals of the strobing sub-circuits in each row are prior to the rising-edge signals of the strobing sub-circuits in the next row, the strobing sub-circuits in the previous row are turned off while the strobing sub-circuits in the next row are turned on, and thus there is a resistance difference therebetween, which is easy to cause the current I to flow around a high impedance and result in an over-change in the voltage to generate noises. However, in the present disclosure, an overlap design of the timings for the strobing sub-circuits in each row and the strobing sub-circuits in the next row can reduce additional noise when the strobing sub-circuits in any rows are switched.

Figure 9:
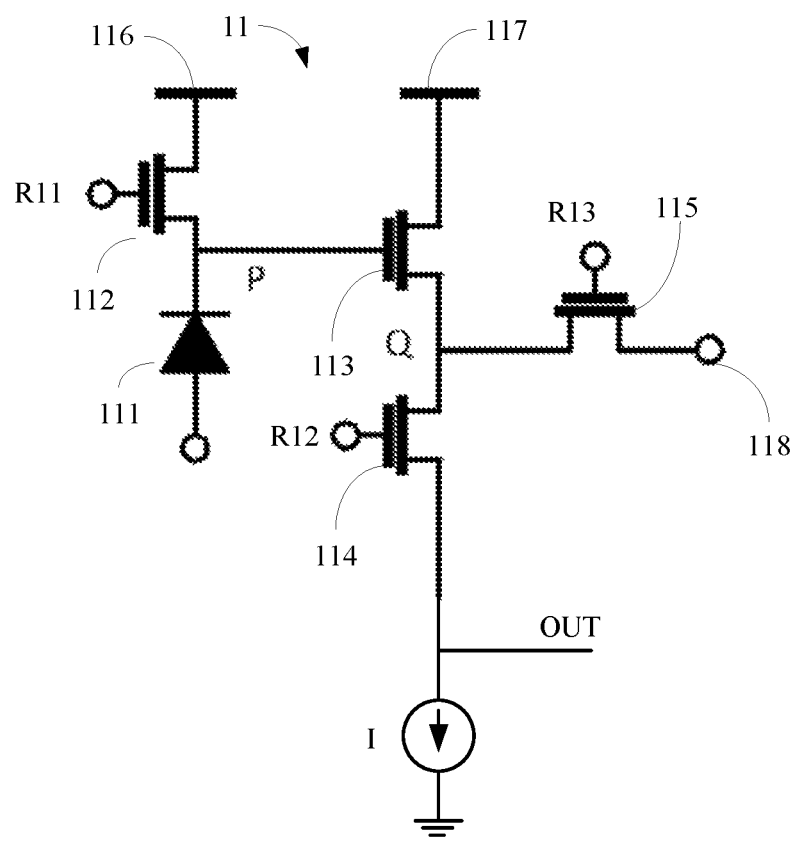
FIG. 9 is a schematic diagram illustrating a structure of a pixel circuit according to some embodiments.

Based on the technical solutions according to some embodiments of the present disclosure, the respective sub-circuit described above will be described in details by still taking the first pixel circuit 11 as an example. As illustrated in FIG. 9, the first pixel circuit 11 can further include a first voltage terminal 116, the resetting sub-circuit 112 can include a source, a gate and a drain. Herein, the gate of the resetting sub-circuit 112 is configured to receive the reset signal, the drain thereof is connected to the first voltage terminal 116 and the source thereof is connected to the photoelectric conversion sub-circuit 111, to reset the photoelectric conversion sub-circuit 111 by the input voltage of the first voltage terminal 116 and the received reset signal. Herein, the first voltage terminals 116 in the same row of the pixel circuits can be connected to a same first voltage input line, and then the plurality of the first voltage input lines are connected to a same first voltage bus.

Furthermore, each pixel circuit 11 can further include a second voltage terminal 117, and the source following sub-circuit 113 can include a gate, a source and a drain. The gate of the source following sub-circuit 113 is connected between the photoelectric conversion sub-circuit 111 and the resetting sub-circuit 112, the drain thereof is connected to the second voltage terminal 117 and the source thereof is connected to the strobing sub-circuit 114. Herein, the second voltage terminals 117 in the same row of pixel circuits can be connected to a same second voltage input line, and then the plurality of second voltage lines are connected to a same second voltage bus.

Similarly, the strobing sub-circuit 114 can include a gate, a source and a drain. The gate of the strobing sub-circuit 114 is configured to receive the strobe signal, the drain thereof is connected to the source following sub-circuit 113, and the source thereof is configured to output the voltage signal of the photoelectric conversion sub-circuit 111.

The first pixel circuit 11 can further include a third voltage terminal 118, and the pre-discharging sub-circuit 115 includes a gate, a source and a drain. Herein, the gate of the pre-discharging sub-circuit 115 is configured to receive the pre-discharge signal, the drain thereof is connected to the third voltage terminal 118, and the source thereof is connected between the source following sub-circuit 113 and the strobing sub-circuit 114. Herein, the third voltage terminals 118 in the same row of pixel circuits can be connected to a same third voltage input line, and then the plurality of third voltage input lines are connected to a same third voltage bus.

In the above embodiments, the resetting sub-circuit 112, the source following sub-circuit 113, the strobing sub-circuit 114 and the pre-discharging sub-circuit 115 are explained by taking a N type semiconductor as an example. In other cases, the resetting sub-circuit 112, the source following sub-circuit 113 and the strobing sub-circuit 114 can all be P type semiconductors, and the present disclosure is not limited thereto.

Figure 10:
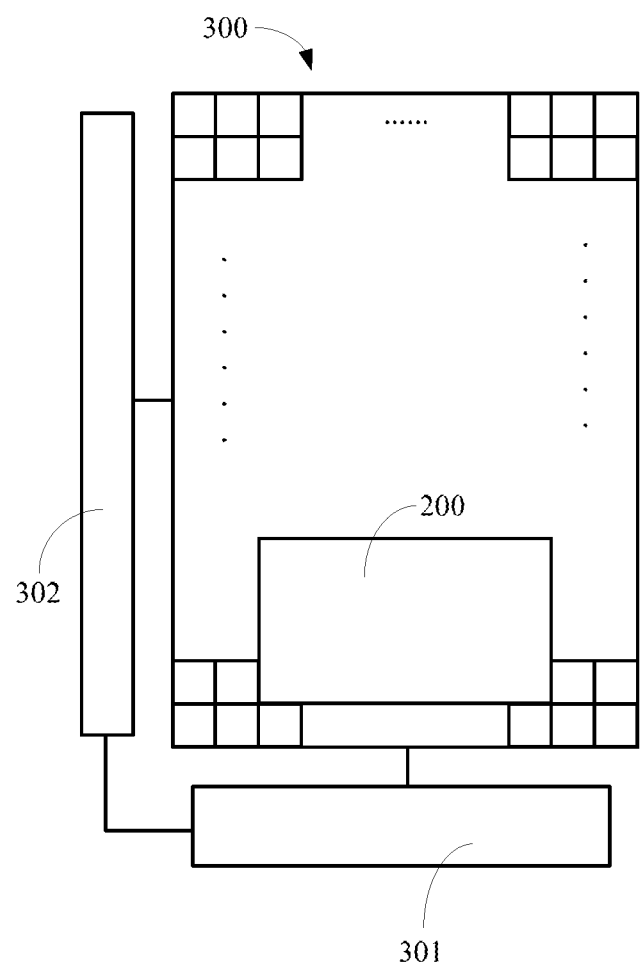
FIG. 10 is a schematic diagram illustrating a structure of a display panel according to some embodiments.

Based on the active pixel sensor array 200 provided in the present disclosure, the present disclosure further provides a display panel 300, as illustrated in FIG. 10, the display panel 300 can include the active pixel sensor array 200 according to any one of the embodiments described above. The active pixel sensor array 200 can be used to form a fingerprint detecting region located on a surface of the display panel 300 to realize an under-screen fingerprint detection function of the display panel 300, and in order to avoid the pixel circuit to occupy a light emitting area additionally, each pixel circuit can be formed within one pixel and located in a black matric area in the pixel. The display panel 300 further includes a chip component 301 which can be connected to the sources of the strobing sub-circuits in the each pixel circuit via a column bus. In order to implement a reasonable arrangement of wirings within the display panel 300, the display panel 300 can further include a bus 302 connected to the chip component 301 and located at a different side of the display panel 300 from the chip component 301, the bus 302 can be configured to input one or more of the reset signal, the strobe signal and the pre-discharge signal; or the bus 302 can be further connected to one or more of the first voltage terminal 116, the second voltage terminal 117 and the third voltage terminal 118 to provide the voltage signal.

Figure 11:
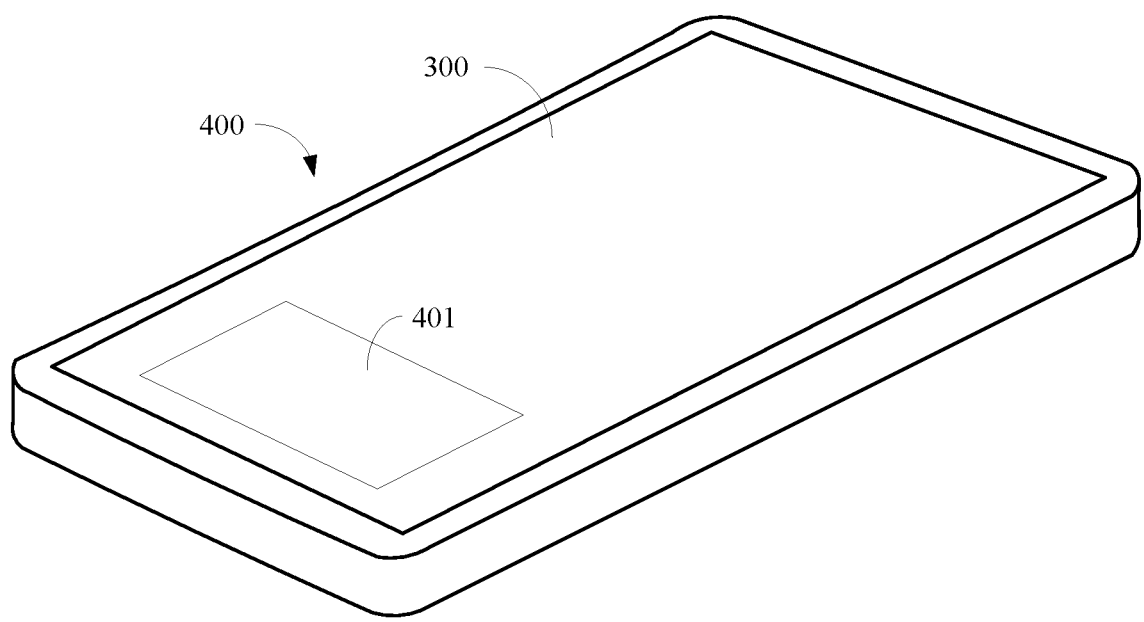
FIG. 11 is a schematic diagram illustrating a structure of an electronic device according to some embodiments.

As illustrated in FIG. 11, the present disclosure further provides an electronic device 400 including the display panel 300 as shown in FIG. 10, and an under-screen fingerprint detecting region 401 can be formed with the active pixel sensor array 200. The electronic device 400 can include a mobile phone terminal or a tablet terminal, and the present disclosure is not limited thereto.

Figure 12:
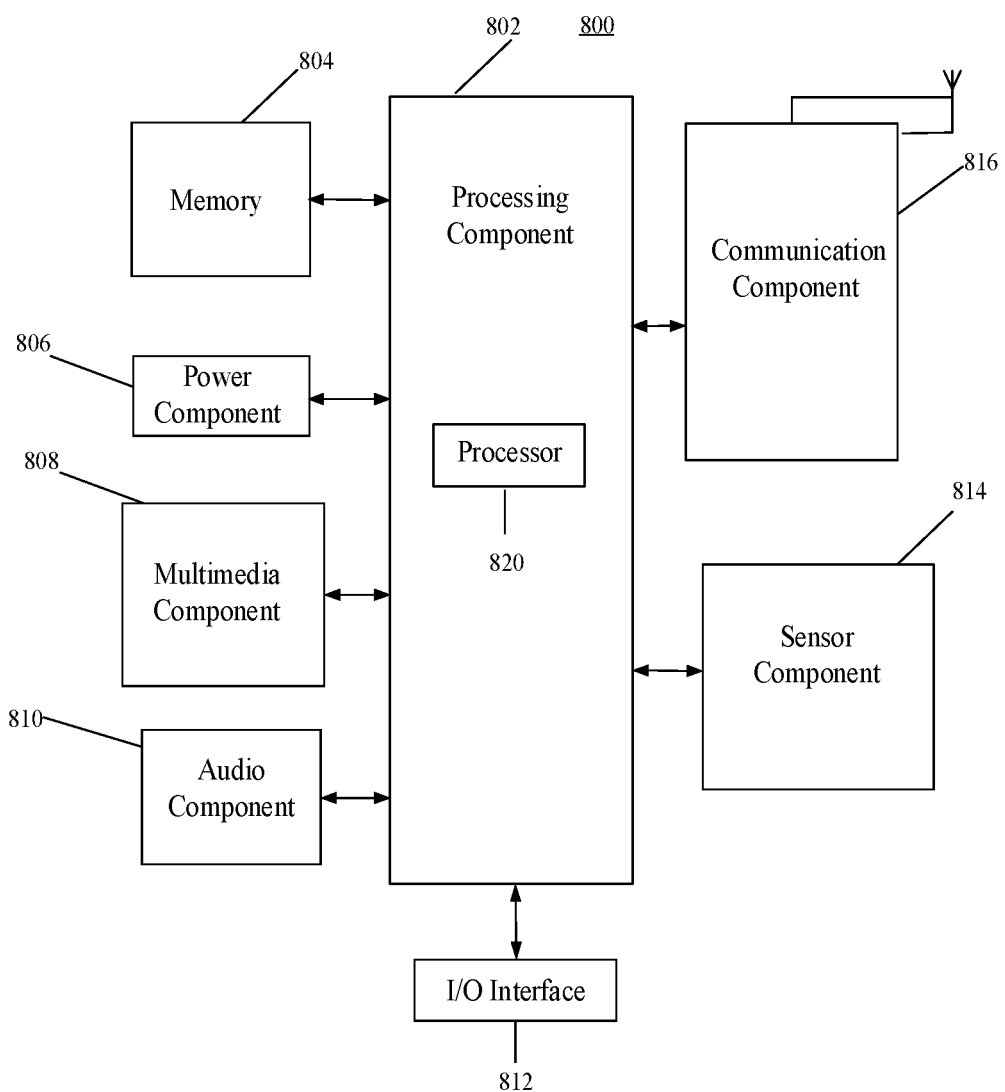
FIG. 12 is a schematic diagram illustrating a structure of a mobile terminal according to some embodiments.

FIG. 12 is a schematic diagram illustrating a structure of a mobile terminal 800 according to some embodiments.

For example, the mobile 800 may be a mobile phone, a computer, a digital broadcasting terminal, a messaging device, a game console, a tablet, a medical device, a fitness apparatus, a personal digital assistant, and the like.

Referring to FIG. 8, the device 800 may comprise one or more of a processing component 802, a memory device 804, a power component 806, a multi-media component 808, an audio component 810, an input/output (I/O) interface 812, a sensor component 814 and a communication component 816.

The processing component 802 typically controls overall operations of the device 800, such as the operations associated with display, telephone calls, data communications, camera operations, and recording operations. The processing component 802 may include one or more processors 820 to execute instructions to perform all or part of the steps in the above described methods. Moreover, the processing component 802 may include one or more modules which facilitate the interaction between the processing component 802 and other assemblies. For instance, the processing component 802 may include a multimedia module to facilitate the interaction between the multimedia component 808 and the processing component 802.

The memory 804 is configured to store various types of data to support the operation of the device 800. Examples of such data include instructions for any applications or methods operated on the device 800, contact data, phonebook data, messages, pictures, video, etc. The memory 804 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 806 provides power to various assemblies of the device 800. The power component 806 may include a power management system, one or more power sources, and any other assemblies associated with the generation, management, and distribution of power in the device 800.

The multimedia component 808 includes a screen providing an output interface between the device 800 and the user. In some embodiments, the screen may include a liquid crystal display (LCD) and a touch panel (TP). In some embodiments, an organic light-emitting diode (OLED) display can be adopted.

If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some embodiments, the multimedia component 808 includes a front camera and/or a rear camera. The front camera and the rear camera may receive an external multimedia datum while the device 800 is in an operation mode, such as a photographing mode or a video mode. Each of the front camera and the rear camera may be a fixed optical lens system or have focus and optical zoom capability.

The audio component 810 is configured to output and/or input audio signals. For example, the audio component 810 includes a microphone (MIC) configured to receive an external audio signal when the device 800 is in an operation mode, such as a call mode, a recording mode, and a voice recognition mode. The received audio signal may be further stored in the memory 804 or transmitted via the communication component 816. In some embodiments, the audio component 810 further includes a speaker to output audio signals.

The I/O interface 812 provides an interface between the processing component 802 and peripheral interface modules, such as a keyboard, a click wheel, buttons, and the like. The buttons may include, but are not limited to, a home button, a volume button, a starting button, and a locking button.

The sensor component 814 includes one or more sensors to provide status assessments of various aspects of the device 800. For instance, the sensor component 814 may detect an open/closed status of the device 800, relative positioning of assemblies, e.g., the display and the keypad, of the device 800, a change in position of the device 800 or an component of the device 800, a presence or absence of user contact with the device 800, an orientation or an acceleration/deceleration of the device 800, and a change in temperature of the device 800. The sensor component 814 may include a proximity sensor configured to detect the presence of nearby objects without any physical contact. The sensor component 814 may also include a light sensor, such as a CMOS or CCD image sensor, for use in imaging applications. In some embodiments, the sensor component 814 may also include an accelerometer sensor, a gyroscope sensor, a magnetic sensor, a pressure sensor, or a temperature sensor.

The communication component 816 is configured to facilitate communication, wired or wirelessly, between the device 800 and other devices. The device 800 can access a wireless network based on a communication standard, such as Wi-Fi, 2G, 3G, 4G, 5G or a combination thereof. In one exemplary embodiment, the communication component 816 receives a broadcast signal or broadcast associated information from an external broadcast management system via a broadcast channel. In one exemplary embodiment, the communication component 816 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In exemplary embodiments, the device 800 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic assemblies, for performing the above described methods.

In exemplary embodiments, there is also provided a non-transitory computer readable storage medium including instructions, such as included in the memory 804, executable by the processor 820 in the device 800, for performing the above-described methods. For example, the non-transitory computer-readable storage medium may be a ROM, a random-access memory (RAM), a CD-ROM, a magnetic tape, a floppy disc, an optical data storage device, and the like.

Various embodiments of the present disclosure can have one or more of the following advantages.

The voltage between the source following sub-circuit and the strobing sub-circuit can be adjusted in advance through the pre-discharge sub-circuit, and the time between the source following sub-circuit and the strobing sub-circuit falling from a high voltage state to a stable state can be shortened, which is beneficial to raise the signal readout efficiency of the active pixel sensor array.

The various device components, modules, units, circuits, sub-circuits, blocks, or portions may have modular configurations, or are composed of discrete components, but nonetheless can be referred to as "modules" in general. In other words, the "components," "modules," "units," "circuits," "sub-circuits," "blocks," or "portions" referred to herein may or may not be in modular forms, and these phrases may be interchangeably used.

In the present disclosure, the terms "installed," "connected," "coupled," "fixed" and the like shall be understood broadly, and can be either a fixed connection or a detachable connection, or integrated, unless otherwise explicitly defined. These terms can refer to mechanical or electrical connections, or both. Such connections can be direct connections or indirect connections through an intermediate medium. These terms can also refer to the internal connections or the interactions between elements. The specific meanings of the above terms in the present disclosure can be understood by those of ordinary skill in the art on a case-by-case basis.

In the description of the present disclosure, the terms "one embodiment," "some embodiments," "example," "specific example," or "some examples," and the like can indicate a specific feature described in connection with the embodiment or example, a structure, a material or feature included in at least one embodiment or example. In the present disclosure, the schematic representation of the above terms is not necessarily directed to the same embodiment or example.

Moreover, the particular features, structures, materials, or characteristics described can be combined in a suitable manner in any one or more embodiments or examples. In addition, various embodiments or examples described in the specification, as well as features of various embodiments or examples, can be combined and reorganized.

In some embodiments, the control and/or interface software or app can be provided in a form of a non-transitory computer-readable storage medium having instructions stored thereon is further provided. For example, the non-transitory computer-readable storage medium can be a ROM, a CD-ROM, a magnetic tape, a floppy disk, optical data storage equipment, a flash drive such as a USB drive or an SD card, and the like.

Implementations of the subject matter and the operations described in this disclosure can be implemented in digital electronic circuitry, or in computer software, firmware, or hardware, including the structures disclosed herein and their structural equivalents, or in combinations of one or more of them. Implementations of the subject matter described in this disclosure can be implemented as one or more computer programs, i.e., one or more portions of computer program instructions, encoded on one or more computer storage medium for execution by, or to control the operation of, data processing apparatus.

Alternatively, or in addition, the program instructions can be encoded on an artificially-generated propagated signal, e.g., a machine-generated electrical, optical, or electromagnetic signal, which is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them.

Moreover, while a computer storage medium is not a propagated signal, a computer storage medium can be a source or destination of computer program instructions encoded in an artificially-generated propagated signal. The computer storage medium can also be, or be included in, one or more separate components or media (e.g., multiple CDs, disks, drives, or other storage devices). Accordingly, the computer storage medium can be tangible.

The operations described in this disclosure can be implemented as operations performed by a data processing apparatus on data stored on one or more computer-readable storage devices or received from other sources.

The devices in this disclosure can include special purpose logic circuitry, e.g., an FPGA (field-programmable gate array), or an ASIC (application-specific integrated circuit). The device can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The devices and execution environment can realize various different computing model infrastructures, such as web services, distributed computing, and grid computing infrastructures.

A computer program (also known as a program, software, software application, app, script, or code) can be written in any form of programming language, including compiled or interpreted languages, declarative or procedural languages, and it can be deployed in any form, including as a stand-alone program or as a portion, component, subroutine, object, or other portion suitable for use in a computing environment. A computer program can, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more portions, sub-programs, or portions of code). A computer program can be deployed to be executed on one computer or on multiple computers that are located at one site or distributed across multiple sites and interconnected by a communication network.

The processes and logic flows described in this disclosure can be performed by one or more programmable processors executing one or more computer programs to perform actions by operating on input data and generating output. The processes and logic flows can also be performed by, and apparatus can also be implemented as, special purpose logic circuitry, e.g., an FPGA, or an ASIC.

Processors or processing circuits suitable for the execution of a computer program include, by way of example, both general and special purpose microprocessors, and any one or more processors of any kind of digital computer. Generally, a processor will receive instructions and data from a read-only memory, or a random-access memory, or both. Elements of a computer can include a processor configured to perform actions in accordance with instructions and one or more memory devices for storing instructions and data.

Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few.

Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented with a computer and/or a display device, e.g., a VR/AR device, a head-mount display (HMD) device, a head-up display (HUD) device, smart eyewear (e.g., glasses), a CRT (cathode-ray tube), LCD (liquid-crystal display), OLED (organic light emitting diode), or any other monitor for displaying information to the user and a keyboard, a pointing device, e.g., a mouse, trackball, etc., or a touch screen, touch pad, etc., by which the user can provide input to the computer.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components.

The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

While this specification contains many specific implementation details, these should not be construed as limitations on the scope of any claims, but rather as descriptions of features specific to particular implementations. Certain features that are described in this specification in the context of separate implementations can also be implemented in combination in a single implementation. Conversely, various features that are described in the context of a single implementation can also be implemented in multiple implementations separately or in any suitable subcombination.

Moreover, although features can be described above as acting in certain combinations and even initially claimed as such, one or more features from a claimed combination can in some cases be excised from the combination, and the claimed combination can be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing can be advantageous. Moreover, the separation of various system components in the implementations described above should not be understood as requiring such separation in all implementations, and it should be understood that the described program components and systems can generally be integrated together in a single software product or packaged into multiple software products.

As such, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking or parallel processing can be utilized.

It is intended that the specification and embodiments be considered as examples only. Other embodiments of the disclosure will be apparent to those skilled in the art in view of the specification and drawings of the present disclosure. That is, although specific embodiments have been described above in detail, the description is merely for purposes of illustration. It should be appreciated, therefore, that many aspects described above are not intended as required or essential elements unless explicitly stated otherwise.

Various modifications of, and equivalent acts corresponding to, the disclosed aspects of the example embodiments, in addition to those described above, can be made by a person of ordinary skill in the art, having the benefit of the present disclosure, without departing from the spirit and scope of the disclosure defined in the following claims, the scope of which is to be accorded the broadest interpretation so as to encompass such modifications and equivalent structures.

It should be understood that "a plurality" or "multiple" as referred to herein means two or more. "And/or," describing the association relationship of the associated objects, indicates that there may be three relationships, for example, A and/or B may indicate that there are three cases where A exists separately, A and B exist at the same time, and B exists separately. The character "/" generally indicates that the contextual objects are in an "or" relationship.

In the present disclosure, it is to be understood that the terms "lower," "upper," "under" or "beneath" or "underneath," "above," "front," "back," "left," "right," "top," "bottom," "inner," "outer," "horizontal," "vertical," and other orientation or positional relationships are based on example orientations illustrated in the drawings, and are merely for the convenience of the description of some embodiments, rather than indicating or implying the device or component being constructed and operated in a particular orientation. Therefore, these terms are not to be construed as limiting the scope of the present disclosure.

Moreover, the terms "first" and "second" are used for descriptive purposes only and are not to be construed as indicating or implying a relative importance or implicitly indicating the number of technical features indicated. Thus, elements referred to as "first" and "second" may include one or more of the features either explicitly or implicitly. In the description of the present disclosure, "a plurality" indicates two or more unless specifically defined otherwise.

In the present disclosure, a first element being "on" a second element may indicate direct contact between the first and second elements, without contact, or indirect geometrical relationship through one or more intermediate media or layers, unless otherwise explicitly stated and defined. Similarly, a first element being "under," "underneath" or "beneath" a second element may indicate direct contact between the first and second elements, without contact, or indirect geometrical relationship through one or more intermediate media or layers, unless otherwise explicitly stated and defined.

Some other embodiments of the present disclosure can be available to those skilled in the art upon consideration of the specification and practice of the various embodiments disclosed herein. The present application is intended to cover any variations, uses, or adaptations of the present disclosure following general principles of the present disclosure and include the common general knowledge or conventional technical means in the art without departing from the present disclosure. The specification and examples can be shown as illustrative only, and the true scope and spirit of the disclosure are indicated by the following claims.

The invention claimed is:

1. An active pixel sensor array, comprising a plurality of pixel circuits arranged in multiple rows and one column or multiple rows and multiple columns, each of the pixel circuits comprising:
   a photoelectric conversion sub-circuit;
   a resetting sub-circuit configured to reset the photoelectric conversion sub-circuit based on a received reset signal;
   a source following sub-circuit connected between the resetting sub-circuit and the photoelectric conversion sub-circuit;
   a strobing sub-circuit connected to the source following sub-circuit and configured to switch an on/off state, based on a received strobe signal, to output, when it is in an on state, a voltage signal of the photoelectric conversion sub-circuit; and
   a pre-discharging sub-circuit with one terminal connected between the source following sub-circuit and the strobing sub-circuit, and configured to switch the on/off state based on a received pre-discharge signal,
   wherein in a case that the plurality of pixel circuits are arranged in the multiple rows and multiple columns, both on time and off time of the strobing sub-circuit in a same row are same, and on time of the strobing sub-circuit in each row is same as on time of the pre-discharging sub-circuit in a next row, and off time of the strobing sub-circuit is same as off time of the pre-discharging sub-circuit in a next row.

2. The active pixel sensor array according to claim 1, wherein the off time of the strobing sub-circuit in each row is after the on time of the strobing sub-circuit in the next row.

3. The active pixel sensor array according to claim 1, wherein a terminal for receiving the strobing signal on the strobing sub-circuit in each row and a terminal for receiving the pre-discharge signal on the pre-discharging sub-circuit in the next row are connected to a same control line.

4. The active pixel sensor array according to claim 1, wherein a terminal for receiving the strobing signal on the strobing sub-circuit in each row and a terminal for receiving the pre-discharge signal on the pre-discharging sub-circuit in the next row are connected to different control lines, and rising edge time and falling edge time of pulse signals output from the different control lines are the same respectively.

5. The active pixel sensor array according to claim 1, wherein each of the pixel circuits further comprises a first voltage terminal, a gate of the resetting sub-circuit is used to receive the resetting signal, a drain thereof is connected to the first voltage terminal and a source thereof is connected to the photoelectric conversion sub-circuit.

6. The active pixel sensor array according to claim 1, wherein each of the pixel circuits further includes a second voltage terminal, a gate of the source following sub-circuit is connected between the photoelectric conversion sub-circuit and the resetting sub-circuit, a drain thereof is connected to the second voltage terminal, and a source thereof is connected to the strobing sub-circuit.

7. The active pixel sensor array according to claim 1, wherein a gate of the strobing sub-circuit is configured to receive the strobe signal, a drain thereof is connected to the source of the source following sub-circuit, and a source thereof is configured to output the voltage signal of the photoelectric conversion sub-circuit.

8. The active pixel sensor array according to claim 1, wherein each of the pixel circuits includes a third voltage terminal, a gate of the pre-discharging sub-circuit is configured to receive the pre-discharge signal, a drain thereof is connected to the third voltage terminal, and a source thereof is connected between the source following sub-circuit and the strobing sub-circuit.

9. A display panel having a fingerprint detecting region comprising the active pixel sensor array according to claim 1, wherein each of the pixel circuits is formed in a pixel; and a chip component connected to each of the pixel circuits and configured to output the resetting signal, the strobe signal and the pre-discharge signal.

10. The display panel according to claim 9, wherein the off time of the strobing sub-circuit in each row is after the on time of the strobing sub-circuit in the next row.

11. The display panel according to claim 9, wherein a terminal for receiving the strobing signal on the strobing sub-circuit in each row and a terminal for receiving the pre-discharge signal on the pre-discharging sub-circuit in the next row are connected to a same control line.

12. The display panel according to claim 9, wherein a terminal for receiving the strobing signal on the strobing sub-circuit in each row and a terminal for receiving the pre-discharge signal on the pre-discharging sub-circuit in the next row are connected to different control lines, and rising edge time and falling edge time of pulse signals output from the different control lines are the same respectively.

13. The display panel according to claim 9, wherein each of the pixel circuits further comprises a first voltage terminal, a gate of the resetting sub-circuit is used to receive the resetting signal, a drain thereof is connected to the first voltage terminal and a source thereof is connected to the photoelectric conversion sub-circuit.

14. The display panel according to claim 8, wherein each of the pixel circuits further includes a second voltage terminal, a gate of the source following sub-circuit is connected between the photoelectric conversion sub-circuit and the resetting sub-circuit, a drain thereof is connected to the second voltage terminal, and a source thereof is connected to the strobing sub-circuit.

15. The display panel according to claim 9, wherein a gate of the strobing sub-circuit is configured to receive the strobe signal, a drain thereof is connected to the source of the source following sub-circuit, and a source thereof is configured to output the voltage signal of the photoelectric conversion sub-circuit.

16. The display panel according to claim 9, wherein each of the pixel circuits includes a third voltage terminal, a gate of the pre-discharging sub-circuit is configured to receive the pre-discharge signal, a drain thereof is connected to the third voltage terminal, and a source thereof is connected between the source following sub-circuit and the strobing sub-circuit.

17. An electronic device comprising the display panel of claim 9, wherein the display panel comprises a liquid-crystal display (LCD) screen or an organic light-emitting diode (OLED) display screen.

18. The electronic device according to claim 17, wherein the fingerprint detecting region is an under-screen fingerprint detecting region formed with the active pixel sensor array.

19. The electronic device according to claim 17, wherein the electronic device is a mobile phone.

20. The electronic device according to claim 17, wherein the pre-discharge sub-circuit is configured to adjust in advance a voltage between the source following sub-circuit and the strobing sub-circuit, thereby shortening a time of a voltage between the source following sub-circuit and the strobing sub-circuit falling from a high voltage state to a stable state, and increasing a signal readout efficiency of the active pixel sensor array.

\* \* \* \* \*